United States Patent
Ho (12)

(10) Patent No.: US 6,607,327 B1
(45) Date of Patent: Aug. 19, 2003

(54) FASTENING DEVICE FOR THE BACKSEAT OF A BICYCLE

(76) Inventor: Kuo-Ping Ho, PO Box 82-144, Taipei (TW)

( * ) Notice: Subject to any disclaimer, the term of this patent is extended or adjusted under 35 U.S.C. 154(b) by 29 days.

(21) Appl. No.: 10/067,352

(22) Filed: Feb. 7, 2002

(51) Int. Cl.[7] ................................................ A44B 21/00
(52) U.S. Cl. .................... 403/322.1; 403/330; 403/325; 24/334; 280/288.4
(58) Field of Search ............................... 403/321, 322.1, 403/327, 330, 325; 24/3.11, 334; 280/288.4

(56) References Cited

U.S. PATENT DOCUMENTS

| | | | | |
|---|---|---|---|---|
| 4,971,345 A | * | 11/1990 | Braun et al. .............. | 280/288.4 |
| 5,829,102 A | * | 11/1998 | Conti .......................... | 24/3.12 |
| 2002/0125679 A1 | * | 9/2002 | Jung ........................ | 280/288.4 |
| 2003/0037417 A1 | * | 2/2003 | Shen et al. ................... | 24/334 |

* cited by examiner

Primary Examiner—Lynne H. Browne
Assistant Examiner—John R. Cottingham
(74) Attorney, Agent, or Firm—Leong C. Lei

(57) ABSTRACT

A fastening device for the backseat of a bicycle having an actuatable fastener, a backseat, and a loaded bag is disclosed. The actuatable fastener of the fastening device includes a fixing plate, a spring and a clipping plate. The surface of the fixing plate, near to the edge thereof, is provided with a through hole each, and a pair of hook sections is provided below the fixing plate. The bottom edge of the hook section is provided with a peg hole, and the clipping plate is located between the hook sections, the bottom section of the clipping plate is provided with a peg hole, and a peg body is used to mount the fixing plate, the clipping plate and the spring into an integrated body. The backseat is provided with a bottom seat having a plurality of peg slots, wherein one end of the peg slot is an engaging board section; a bag seat is located below the loaded object and the bottom section of the bag seat is provided with a plurality of engaging pegs, wherein the cross-section of the peg body has an L-shape having a slot at the inner side thereof; thereby the engaging peg on the bag seat is in alignment with the corresponding peg slot at the bottom seat and the slot of the engaging peg is pegged with the engaging board section, and the clipping plate is automatically fasten to a dismantling rod of the backseat.

7 Claims, 8 Drawing Sheets

US 6,607,327 B1

FASTENING DEVICE FOR THE BACKSEAT OF A BICYCLE

BACKGROUND OF THE INVENTION (a) Field of the Invention

The present invention relates to a fastening device, and in particular, a fastening device that can be conveniently mounted onto the backseat of the bicycle to fasten a loaded object. When the fastening device is not in use, the device can be conveniently and easily unloaded.

(b) Description of the Prior Art

Generally, when a loaded bag is to be carried on the backseat of the bicycle, a rope is normally used to tight the bag body together with the backseat. When the bag is to be unloaded, it is rather laborious to untie the rope from the backseat. As a result of this, the backseat of the bicycle is not practical to carry loaded bag.

Taiwanese Patent Publication no. 370052 entitled "Rapid Dismantling Loading Rack Structure" discloses a structure comprising a loading rack, a face board, an outer fixing rack, and an inner fixing rack, a hook and an engaging button. This conventional structure employs the engaging hook and the engaging button to mount the external fixing rack onto a fixing rod. When the bag is positioned onto the external fixing rack, the inner fixing rack is inserted into the loaded bag and then is mounted with the external fixing rack. This conventional structure solves the drawback of employing a rope for tightening but the structure is too complicated. Furthermore, prior to fastening the loaded bag, the objects within the bag have to be unloaded, and then the loaded bag can be fixed onto the fixing rod. Accordingly, it is a main object of the present invention to provide a fastening device for the backseat of a bicycle, which mitigates the above drawbacks.

SUMMARY OF THE INVENTION

Accordingly, it is an object of the present invention is to provide a fastening device for the backseat of a bicycle, wherein the fastening device can be easily and conveniently dismantled from the backseat of the bicycle when it is not in use.

Yet another object of the present invention is to provide a fastening device for the backseat of a bicycle having an actuatable fastener, a backseat, and a loaded bag, characterized in that the actuatable fastener includes a fixing plate, a spring and a clipping plate, the surface of the fixing plate, near to the edge thereof, is provided with a through hole each, and a pair of hook sections are provided below the fixing plate, the bottom edge of the hook section is provided with a peg hole, and the clipping plate is located between the hook sections, the bottom section of the clipping plate is provided with a peg hole, and a peg body is used to mount the fixing plate, the clipping plate and the spring into an integrated body; the backseat is provided with a bottom seat having a plurality of peg slots, wherein one end of the peg slot is an engaging board section; a bag seat is located below the loaded object and the bottom section of the bag seat is provided with a plurality of engaging pegs, wherein the cross-section of the peg body has an L-shape having a slot at the inner side thereof; thereby the engaging peg on the bag seat is in alignment with the corresponding peg slot at the bottom seat and the slot of the engaging peg is pegged with the engaging board section, and the clipping plate is automatically fasten to a dismantling rod of the backseat.

Other objects and advantages of the present invention will become more apparent from the following description taken in conjunction with the accompanying drawing.

DETAILED DESCRIPTION OF THE PRESENT INVENTION

Figure 1:
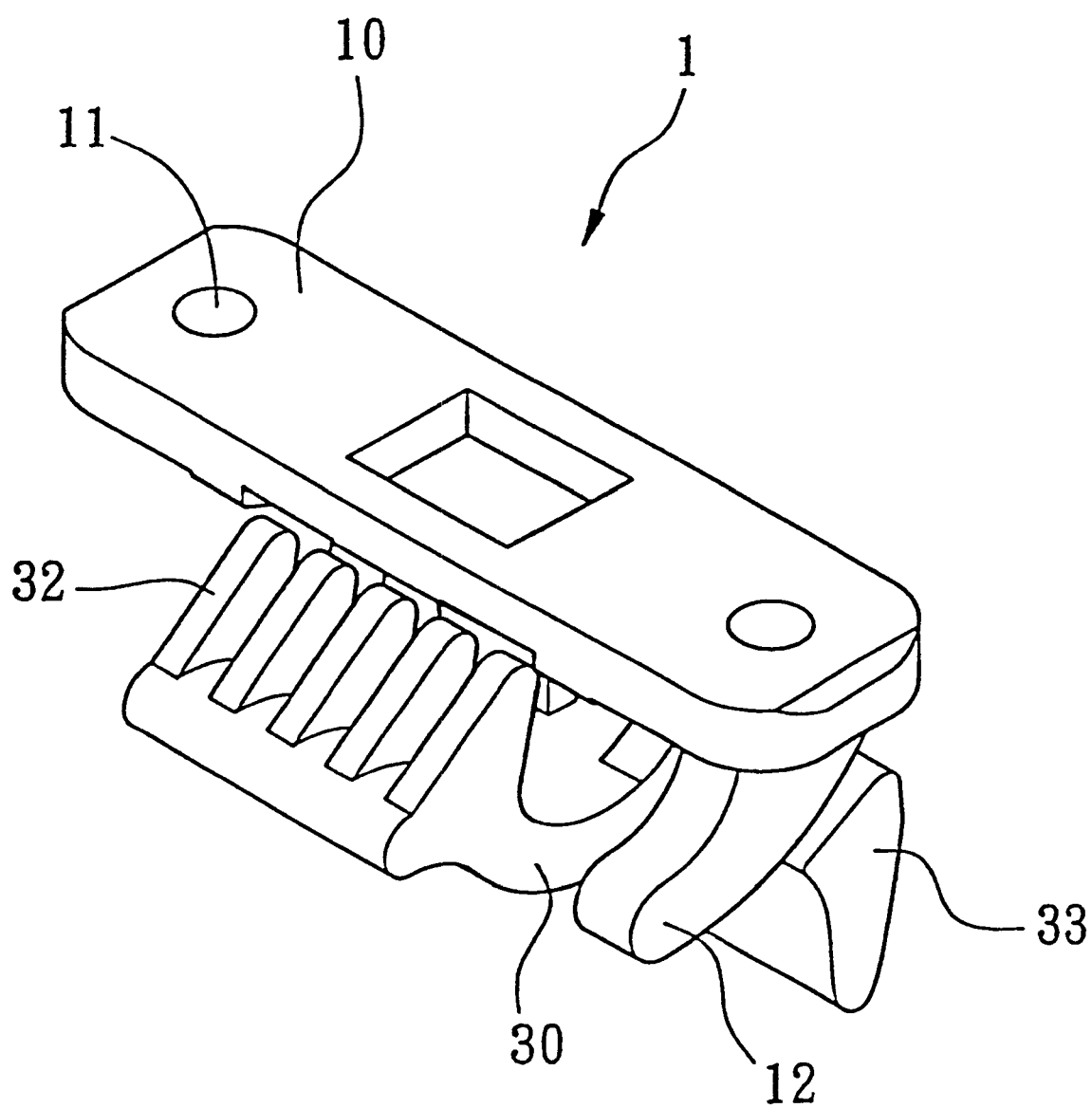
FIG. 1 is a perspective view of a fastening device for the backseat of a backseat of a bicycle in accordance with the present invention.
Figure 2:
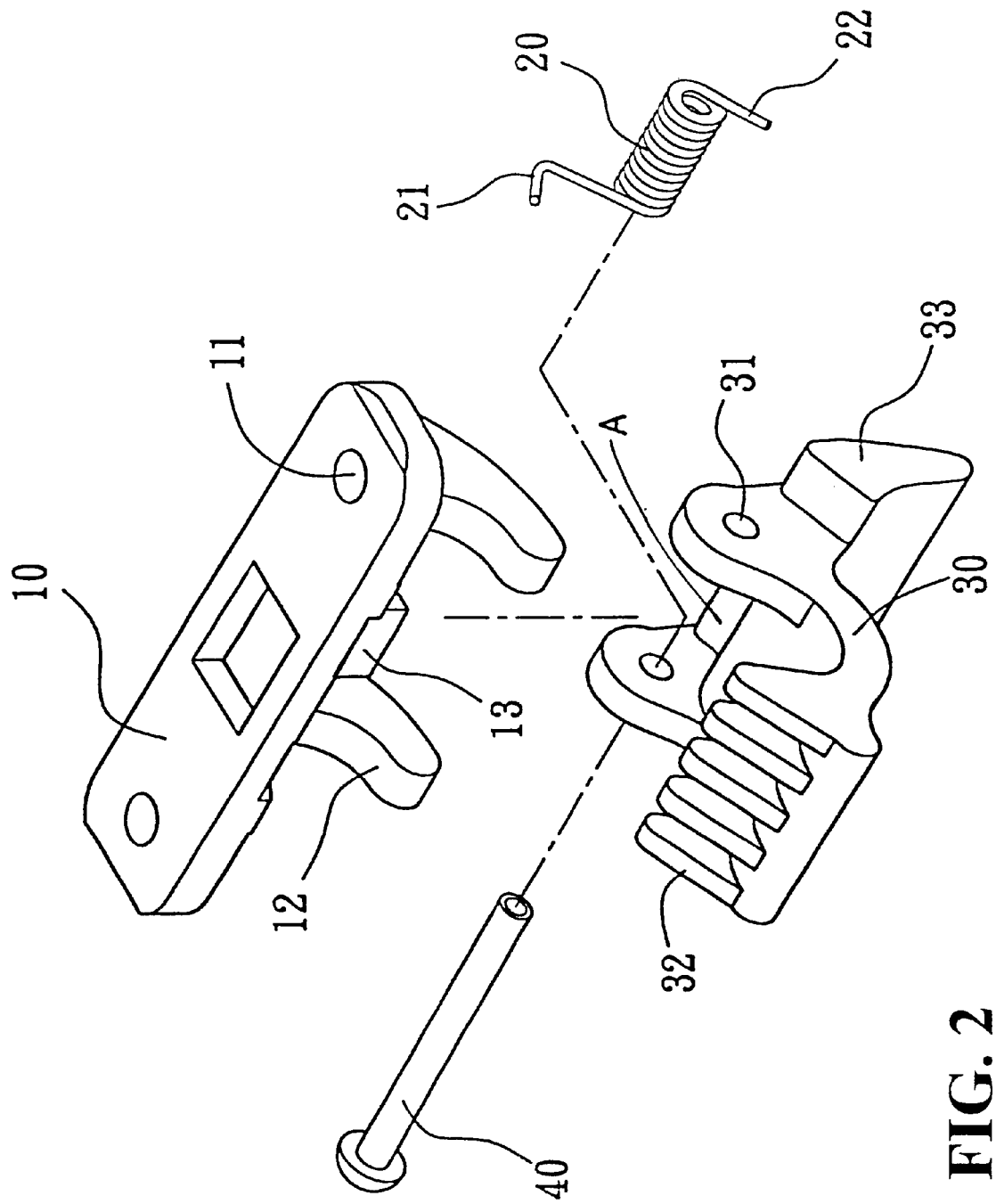
FIG. 2 is a perspective exploded view of the fastening device for the backseat of a bicycle in accordance with the present invention.
Figure 3:
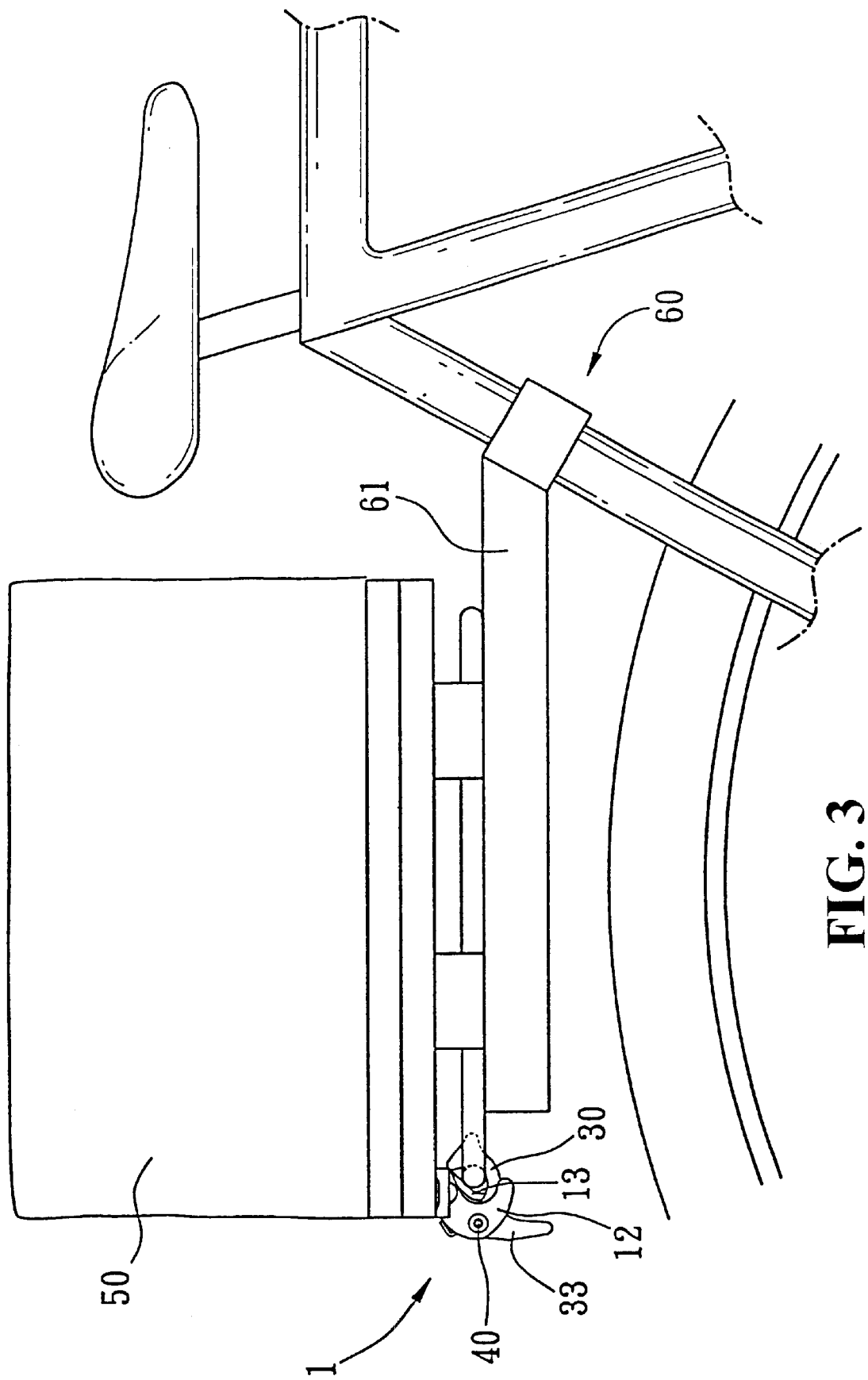
FIG. 3 is a schematic view showing the loaded object being fasten to the backseat of the bicycle via the fastening device in accordance with the present invention.

Referring to FIGS. 1 to 3, there is shown a fastening device for the backseat of a bicycle comprising an actuatable fastener 1, a bag body 50 (i.e. a loaded object) and the backseat of the bicycle. The actuatable fastener 1 includes a fixing plate 10, a spring 20 and a clipping plate 30.

In accordance with the present invention, the surface of the fixing plate 10 is provided with a through hole 11 each at proximity to the side thereof, and the bottom face of the fixing plate 10 is provided with two hook sections 12 having a peg hole each (not shown). The bottom center of the fixing plate 10 is provided with an urging plate 13.

The urging plate 30 does not have a regular shape, and at one side thereof, a press section 33 is provided. Two peg holes 31 are provided to the press section, and a recessed body A is formed between the two peg holes 31 on the press section 33. The other corresponding side of the press section 33 is provided with a plurality of triangular shape urging plate body 32. The front and rear end of a spring 20 are formed into a front leg 21 and a rear leg 22.

In combination, the clipping plate 30 is positioned between the two hook sections 12. The peg hole (not shown) on the hook section 12 is aligned with the peg hole 31 of the clipping plate 30, and the spring 20 is positioned between the clipping plate 30 and the fixing plate 10. A peg body 40 passes through the peg holes 31 and the spring 20 so that these three components are combined to form as one body. At the same time, the front leg 21 of the spring 20 extended outward urges the inner side of the hook section 12, and the rear leg 22 of the spring 20 urges the recessed body A of the clipping plate 30 such that the clipping plate 30, by means of the urging of the spring 20, causes the fastening of the urging plate body 32 with the hook sections 12. A cavity space is formed between these two components, and the urging plate 13 of the fixing plate 10 can be exactly urged against the clipping plate 30.

Figure 4:
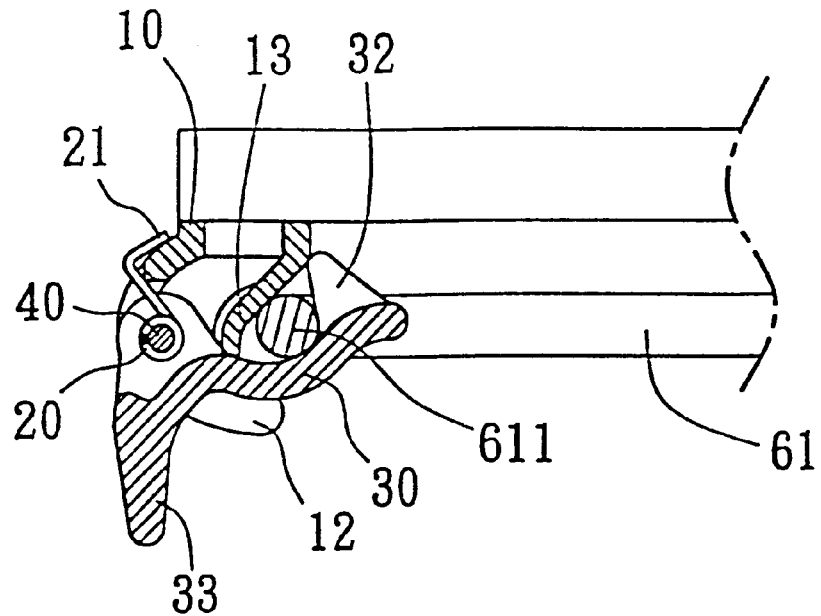
FIG. 4 is a partial sectional view of FIG. 3 of the present invention.

Referring to FIGS. 3 and 4, the actuatable fastener 1 is secured onto a loaded object. In the present preferred embodiment, the loaded object is a bag body 50. The through hole 11 of the fixing plate 10 is fastened at the rear edge of the bottom section of the bag body 50 by means of screws and is then positioned onto the backseat of the bicycle 60.

When the bag body 50 is pushed forward, the urging plate 32 exactly urges against the rear rod 611 of the backseat 61. As a result of the forward force (as shown in FIG. 4,) the exerting force of the urging plate body 32 will be automatically opened because of the inclined face. The rear rod 611 of the backseat 61 will slide into the cavity space of the actuatable fastener 1 to achieve tight securing. The urging of the urging plate 13 causes the bag body 50 to be settable without shaking.

Figure 5:
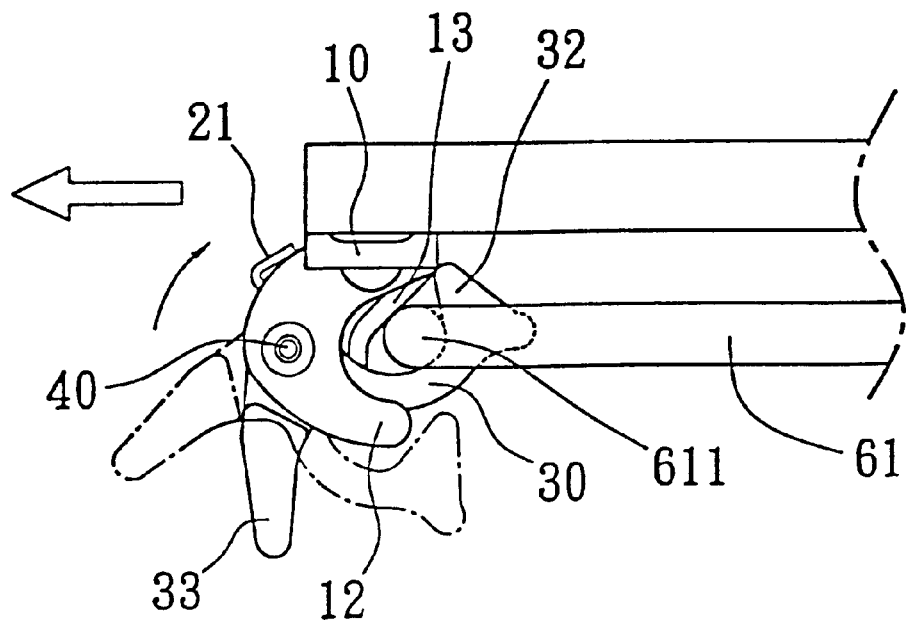
FIG. 5 is a schematic view showing the fastening device being unloaded from the tail rod of the backseat of the present invention.

As shown in FIG. 5, when the loaded bag body 50 is to be removed or unloaded, the press section 33 is lifted backward, and the urging plate body 32 is opened and the bag body 50 is pulled out along the action. The rear rod 611 is dislocated from the cavity space of the actuatable fastener 1. As a result, the fastening or unloading of the fastening device of the present invention is simple and convenient.

Figure 6:
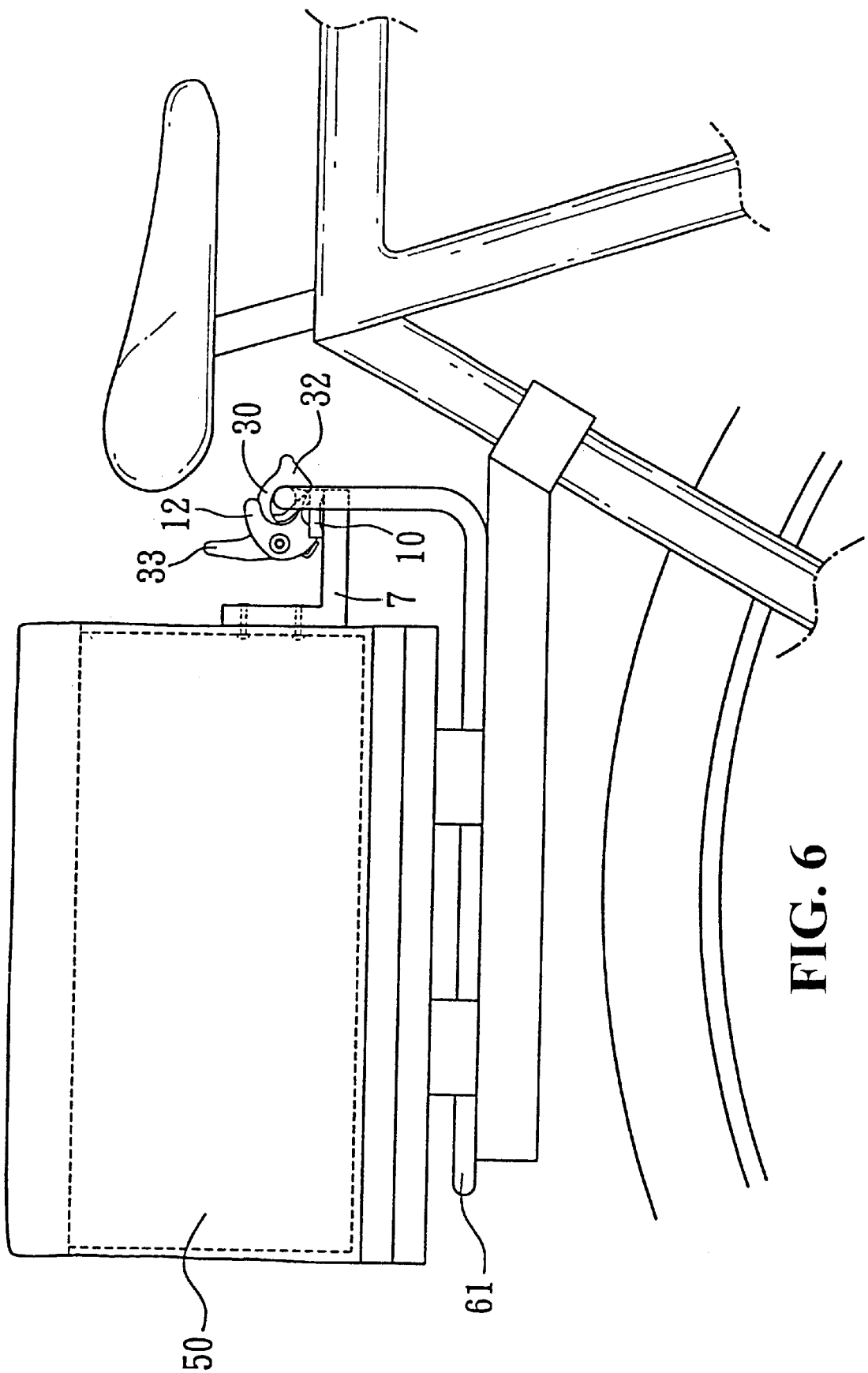
FIG. 6 schematically shows another application of the fastening device in accordance with the present invention.
Figure 7:
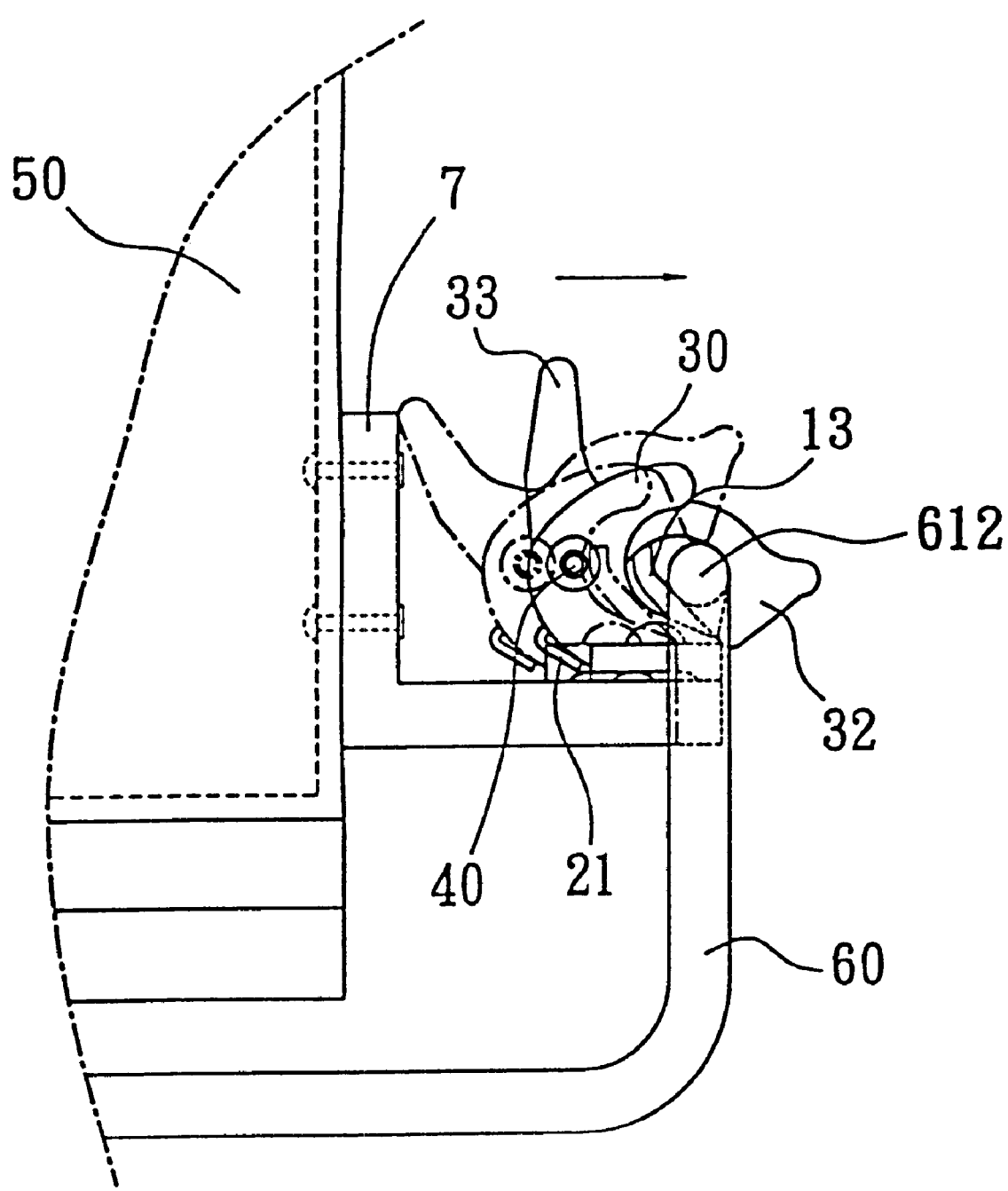
FIG. 7 is a partial sectional view of FIG. 6 in accordance with the present invention.

Referring to FIGS. 6 and 7, if the backseat 61 of the bicycle has an upright dismantling fastening rod 612 at the front section thereof, the actuatable fastener 1 is connected to a L-shaped connection block 7, and the connection block 7 is engaged at the lower edge of the front of the bag body 50. The urging plate body 32 urges at the dismantling fastening rod 612, and a horizontal forward force is exerted, the urging plate body 32 will be opened following the force. The dismantling fastener rod 612 slides into the cavity space of the actuatable fastener 1. The urging of the urging plate 13 stables the bag body 50 so that the bag body 50 will not shake. Similarly, when the fastening device is not in use, the press section 33 of the actuatable fastener 1 is pressed backward and the urging plate 32 is opened, facilitating the dislocation of the rod body (as shown in FIG. 7).

Figure 8A:
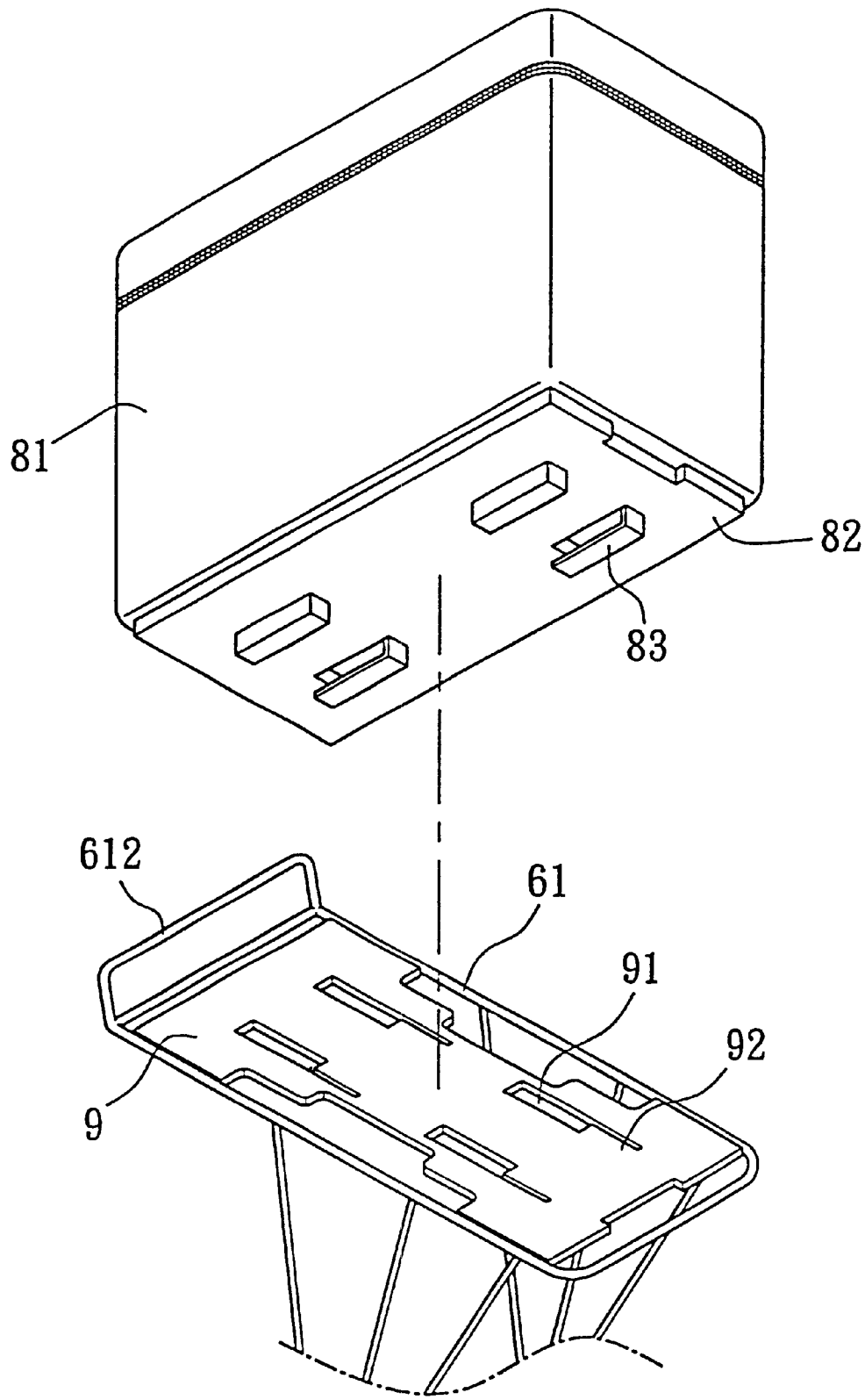
FIGS. 8a and 8b are perspective views showing the mounting of the bottom plate of the loaded object at the backseat of the bicycle with the present invention.
Figure 8B:
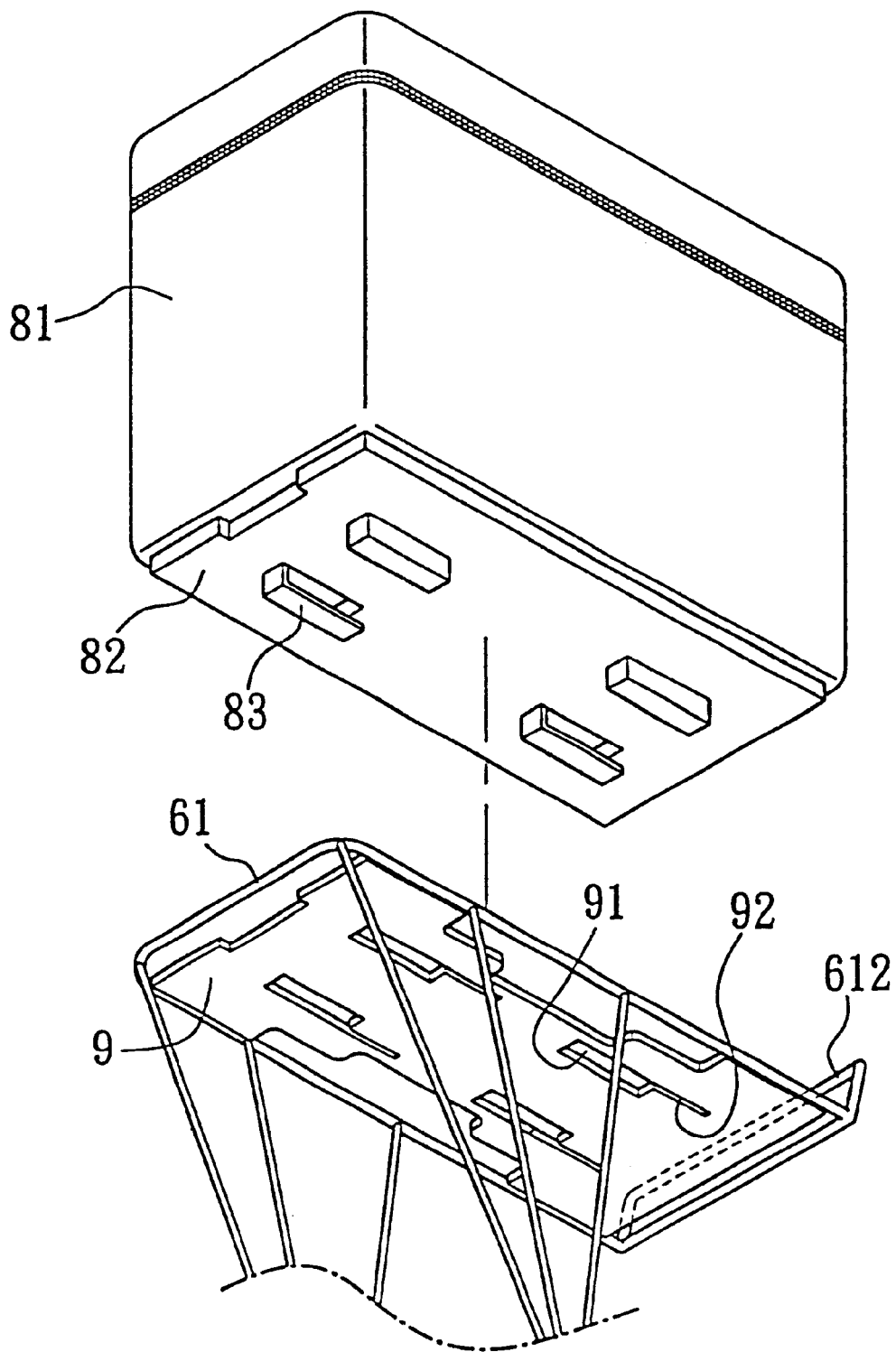

As shown in FIGS. 8a and 8b, there is shown the fastening device of the present invention used for fastening to a basket body onto the backseat of a bicycle. The basket body comprises an upper bag and a bottom seat, wherein the upper bag has a bag body 81 and a bag seat 82. The bottom section of the bag seat 82 is provided with the engaging peg 83, and the cross-sectional of the peg 83 is L-shaped with inner slot. The bag seat is combined with bag body 81 by means of rivets, and the front edge of the bag body 81 is connected to the actuatable fastener 1 by means of a connection block 7 to form an integrated body.

The bottom seat 9 can be connected to the backseat of the bicycle, and a plurality of pegging slots 91 are provided on the bottom seat 9 and corresponds to the engaging pegs 83 on the bag seat 82. One end of the pegging slot 91 is provided with an engaging board section 92.

When a bag body 81 is to be rapidly mounted onto the backseat 61 of the bicycle, the engaging peg 83 at the bottom of the bag seat 82 is aligned and inserted into the corresponding peg slot 91 of the engaging seat 9. The upper bag is pushed along the rear engaging board section 92 of the peg slot 91, such that the slot of the engaging peg 83 is pegged with the engaging board section 92, and the engaging peg board body is in engagement within the slot, and at the same time, the clipping plate of the actuatable fastener can clip the dismantling fastening rod 612 of the backseat 61.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A fastening device for the backseat of a bicycle having an actuatable fastener, a backseat, and a loaded bag, characterized in that the actuatable fastener includes a fixing plate, a spring and a clipping plate, the surface of the fixing plate, near to the edge thereof, is provided with a through hole each, and a pair of hook sections are provided below the fixing plate, the bottom edge of the hook section is provided with a peg hole, and the clipping plate is located between the hook sections, the bottom section of the clipping plate is provided with a peg hole, and a peg body is used to mount the fixing plate, the clipping plate and the spring into an integrated body; the backseat is provided with a bottom seat having a plurality of peg slots, wherein one end of the peg slot is an engaging board section; a bag seat is located below the loaded object and the bottom section of the bag seat is provided with a plurality of engaging pegs, wherein the cross-section of the peg body has an L-shape having a slot at the inner side thereof; thereby the engaging peg on the bag seat is in alignment with the corresponding peg slot at the bottom seat and the slot of the engaging peg is pegged with the engaging board section, and the clipping plate is automatically fasten to a dismantling rod of the backseat.

2. The fastening device of claim 1, wherein the front and rear end of the spring are formed into extended supporting legs.

3. The fastening device of claim 1, wherein the center of the bottom of the fixing plate is provided with an urging plate being located between the two hook sections.

4. The fastening device of claim 1, wherein the clipping plate has an irregular shape body and the upper section of the body is provided with a press section, and the two lateral sides of the press section are provided with peg hole, and the front end of the clipping plate is provided with a plurality of triangular shape plate body being the urging plate body.

5. The fastening device of claim 4, wherein a recessed body is located between two peg holes of the clipping plate.

6. The fastening device of claim 1, wherein the loaded object included a basket body, a bag body, a box body and a baby carriage.

7. The fastening device of claim 1, wherein the actuatable fastener is combined with a L-shaped connection block for fasten at the front of the backseat, wherein the front is an upward protruded dismantling fastening rod.

* * * * *